United States Patent
Iwai et al.

[11] Patent Number: 5,951,041
[45] Date of Patent: Sep. 14, 1999

[54] GAS GENERATOR FOR AIR BAG AND AIR BAG SYSTEM

[75] Inventors: Yasunori Iwai, Shijonawate; Nobuyuki Katsuda, Himeji, both of Japan

[73] Assignee: Daicel Chemical Industries, Ltd., Osaka, Japan

[21] Appl. No.: 08/848,599

[22] Filed: Apr. 29, 1997

[30] Foreign Application Priority Data

Dec. 31, 1996 [JP] Japan ...................................... 8-290347

[51] Int. Cl.[6] .................................................. B60R 21/26
[52] U.S. Cl. ........................................... 280/737; 280/741
[58] Field of Search ..................................... 280/737, 741

[56] References Cited

U.S. PATENT DOCUMENTS

| 5,423,570 | 6/1995 | Kort et al. | 280/741 |
| 5,482,316 | 1/1996 | Lang et al. | 280/741 |

FOREIGN PATENT DOCUMENTS

| 0698535A2 | 2/1996 | European Pat. Off. . |
| 0705739A1 | 4/1996 | European Pat. Off. . |
| 2257951 | 1/1993 | United Kingdom . |

OTHER PUBLICATIONS

Patent Abstracts of Japan, vol. 017, No. 598 (M–1504), Nov. 2, 1993 (JP 05–178152 A).

*Primary Examiner*—Kenneth R. Rice

[57] ABSTRACT

A gas generator is provided which is less likely to suffer from damages or peeling-off of a protruding seal tape during assembling of the generator, thus surely assuring a moisture preventive effect by the seal tape.

In the gas generator for an air bag, a recess is formed in a portion of a partition wall that divides a housing into an ignition means storage chamber that stores igniting means and a gas generating agent storage means that stores a gas generating agent, or in a portion of a housing, to which a seal tape is attached to close through-holes formed through the partition walls or housing. The depth and width of the recess are equal to or larger than the thickness and width of the seal tape. The seal tape is attached such that its side edge portions are received in the recess, so as to close the through-holes.

17 Claims, 4 Drawing Sheets

GAS GENERATOR FOR AIR BAG AND AIR BAG SYSTEM

FIELD OF THE INVENTION

The present invention relates to a gas generator for an air bag, for protecting a passenger from an impact or shock, and an air bag system.

DESCRIPTION OF THE PRIOR ART

In a conventional gas generator for an air bag, a housing that stores an igniting means, gas generating agent, coolant and/or filter and others is divided into two or more chambers, such as an igniting means storage chamber that stores the igniting means, and a gas generating agent storage chamber that stores the gas generating agent. A plurality of through-holes are formed through a partition wall that separates the igniting means storage chamber from the gas generating agent storage chamber, such that these chambers communicate with each other through the through-holes. In this type of gas generator, an annular seal tape is attached to the partition wall provided between the igniting means storage chamber and the gas generating agent storage chamber, so as to close a series of through-holes formed in the circumferential direction of the generator, thereby to prevent the igniting means in the igniting means storage chamber from absorbing moisture.

Since the partition wall to which the seal tape is attached has a relatively smooth, curved surface, the annular seal tape that is attached to the partition wall to close the through-holes protrudes from the curved surface of the partition wall, by an amount corresponding to the thickness of the tape.

On the other hand, the partition wall and housing to which such seal tapes are attached are conventionally formed by casting or press working. Where the housing is formed by casting, it is difficult to form a smooth surface for attachment of the seal tape, and the surface to which the seal tape is attached may involve concavities and convexities, or deformation, for example. Where the housing is formed by press working, vertical streaks may appear on the wall surface due to the press working. Further, where the housing is formed by press working, the wall surface of the housing is slightly inclined or tapered by press draft, thus making it impossible to mate or align the initial and terminal ends of the strip-like seal tape with each other so as to attach the tape in the same horizontal plane. Thus, the seal tape is required to have an excessively large width to close the through-holes.

As described above, the seal tape attached to the partition wall protrudes from the curved surface of the partition wall by the amount equivalent to the thickness of the tape, thereby causing the following problems. In the case where a coolant support member is provided between the partition wall and the coolant, and bent portions are formed in this support member by bending its radially inner and outer portions in the same direction, such that the support member is fixed by the resilient force of these bent portions, the coolant support member is pressed against the partition wall and coolant when it is inserted between these members, and the seal tape protruding from the curved surface of the partition wall may be possibly damaged by this coolant support member. If the seal tape is damaged, the outside air (moisture) enters the igniting means storage chamber, and dampens a transfer charge in the igniting means storage chamber. The moisture may eventually prevent firing of the gas generating agent, causing some problem in the operation of the air bag system.

Since concavities or convexities, or deformation tend to appear on the wall surface of the housing formed by casing, and vertical streaks tend to appear on the wall surface of the housing formed by press working, a clearance or clearances may appear between the wall surface and the seal tape when the seal tape is attached to the wall surface, and a complete sealing effect cannot be achieved. If the housing is formed by press working, the wall surface slightly inclined by press draft is not in parallel with the center axis of the housing, and the seal tape attached to the inclined wall surface needs to have a larger width than that of a tape attached to a purely cylindrical surface.

SUMMARY OF THE PRESENT INVENTION

It is therefore an object of the present invention to provide a novel gas generator for an air bag, which solves the problems encountered in the prior art.

The gas generator for an air bag according to the present invention includes at least a housing that stores at least a gas generating agent, igniting means, and a coolant and/or a filter, and is characterized in that a recess is formed in a portion of the generator to which a seal tape for closing through-holes is attached, the recess having a depth and a width that are not smaller than a thickness and a width of the seal tape attached, respectively, the seal tape being attached inside the recess. This recess may be formed in a partition wall that divides the housing into an igniting means storage chamber storing the igniting means and a gas generating agent storage chamber storing the gas generating agent, such that the recess is located in a portion of the partition wall to which the seal tape is attached so as to close at least one through-hole formed in the partition wall for communication with the storage chambers. The recess may also be formed at a portion of the housing to which is the seal tape attached so as to close at least one through-hole formed in the housing to allow a generated gas to be discharged therethrough. This recess may be more easily formed in an outer wall surface of the partition wall and/or an inner wall surface of the housing.

The housing may be formed by casing or forging, or may be formed by pressing a diffuser shell having through-holes through which the generated gas is discharged, and a closure shell having a central aperture, and welding these shells to each other. Where the diffuser shell and closure shell are formed by press working, the housing can be easily manufactured at a reduced cost. Each of the diffuser shell and closure shell may be formed from a stainless steel plate having a thickness of 1.2 to 2.0 mm, for example, and the diffuser shell may have an outside diameter of 65 to 70 mm, while the closure shell may have an outside diameter of 65 to 75 mm. These shells may be formed from steel plates plated with nickel, instead of stainless steel plates. The diffuser shell and closure shell are assembled together to form the housing of the gas generator, and at least one of these shells may be formed with a mounting flange. In forming the housing, the diffuser shell and closure shell may be joined together by various welding methods, such as plasma welding, friction welding, projection welding, electron beam welding, laser welding and TIG welding. A space of 1.0 to 4.0 mm is preferably formed between the outer circumferential wall of the housing formed by diffuser shell and closure shell, and the coolant and/or filter. This space functions as a gas passage through which the gas reaches the through-holes formed in the diffuser shell, after passing through the coolant and/or filter where it is cooled and purified.

A total of 12 to 20 through-holes each having a diameter of 1.5 to 3.0 mm are desirably formed through the diffusion shell in the circumferential direction. The seal tape as described later is attached to these through-holes so as to block entry of the outside air (moisture) through the holes. The recess is formed in a portion of the diffuser shell to which the seal tape is attached. The total height of the housing is preferably in the range of 30 to 35 mm.

In the housing as described above, the igniting means storage chamber and gas generating agent storage chamber are formed, such that these chambers are separated from each other by the partition wall. The partition wall is formed with through-holes which communicate with both of the storage chambers. In operation, a flame of a transfer charge stored in the igniting means storage chamber is ejected through these through-holes. The through-holes may be arranged in a single array in the circumferential direction of the partition wall, or may be arranged in two arrays in a staggered form. According to the present invention, the seal tape is attached inside the recess formed around the peripheries of the through-holes, so as to inhibit entry of moisture from the outside into the igniting means storage chamber or gas generating agent storage chamber.

The seal tape preferably has a width of 2 to 3.5 times the diameter of the through-holes. Where the through-holes are arranged in a staggered form, for example it is preferable that, the upper end of the through-holes and the upper edge of the seal tape, and the lower end of the through-holes and the lower edge of the seal tape are respectively spaced apart from each other at least by a distance of about 0.5 to 1.25 times the diameter of the through-holes. The seal tape may comprise an aluminum tape having a thickness of 25 to 80$\mu$, and an adhesive having a thickness of 25 to 60$\mu$, and the total thickness of the seal tape is desirably in the range of 95±45$\mu$. When the thickness of the aluminum tape is 25$\mu$ or larger, the entry of moisture through the aluminum tape can be completely inhibited. When the thickness of the aluminum tape is 80 $\mu$m or larger, however, the aluminum tape is unlikely to rupture even when gases are generated upon burning of the gas generating agent, thus requiring an increased time to rupture the tape, resulting in a delay in the operation of the air bag system. Accordingly, the thickness of the aluminum tape used as the seal tape is desirably in the range of 25 to 80 $\mu$m. The aluminum tape may be an adhesive aluminum tape, or may be attached by means of various kinds of adhesives, preferably, a hot melt adhesive. The hot melt adhesive is fused upon application of heat thereto, so as to surely bond the seal tape to the partition wall or housing. Where the aluminum tape is used as the seal tape, and the housing or partition wall to which the seal tape is attached is formed of aluminum, the aluminum tape may be attached by welding, without using an adhesive. The upper surface of the aluminum tape may be coated with Teflon or the like.

The recess is formed in the portion of the partition wall or housing to which the above-described seal tape is attached, with the depth and width of the recess being equal to or larger than the thickness and width of the seal tape. This recess should be formed to satisfy at least a condition that the seal tape attached inside the recess does not protrude from the surface of the partition wall. Although it is desirable that the width of this recess is equal to that of the tape attached thereto, it may be slightly larger than the width of the tape. It is, however, to be noted that the formation of the recess becomes meaningless if the width of the recess is substantially larger than that of the seal tape. Thus, the width of the recess is desirably controlled to be 1.2 to 1.5 times the width of the seal tape attached thereto. Further, the bottom wall of the recess is desirably formed to be in parallel with the center axis of the housing. In this case, the initial and terminal ends of the strip-like seal tape attached to the recess can be mated or aligned with each other in the same horizontal plane, even where the housing is formed by pressing, and its wall surface is inclined due to press draft, for example. With the recess formed in the portion to which the seal tape is attached, the bottom wall of the recess provides a smooth, curved surface, and therefore no clearance appears in the seal tape attached to the bottom wall, even if the housing or partition wall to which the seal tape is attached involves concavities and convexities, or deformation. Moreover, the recess formed according to the present invention is useful for positioning the seal tape when it is attached. This recess may be formed by a known method, such as etching or cutting.

With the seal tape thus attached to the bottom of the recess, the seal tape does not protrude from the smooth surface of the partition wall. Where the recess is formed in the surface of the partition wall on the side of the gas generating agent storage chamber, the seal tape attached to close the through-holes does not suffer from damages when mounting a coolant support member or cushion member as described later in the housing.

In another form of the present invention, after the seal tape is attached inside the recess, side edge portions of the seal tape may be sealed by a sealant, so as to surely inhibit entry of moisture through the side faces of the seal tape. After the seal tape is received in the recess, the sealant may cover the side edge portions of the seal tape in the recess, or may fill the whole recess, in an amount sufficient to inhibit entry of the moisture through the side edge portions of the seal tape.

DETAILED DESCRIPTION OF THE PREFERRED EMBODIMENTS

Figure 1:
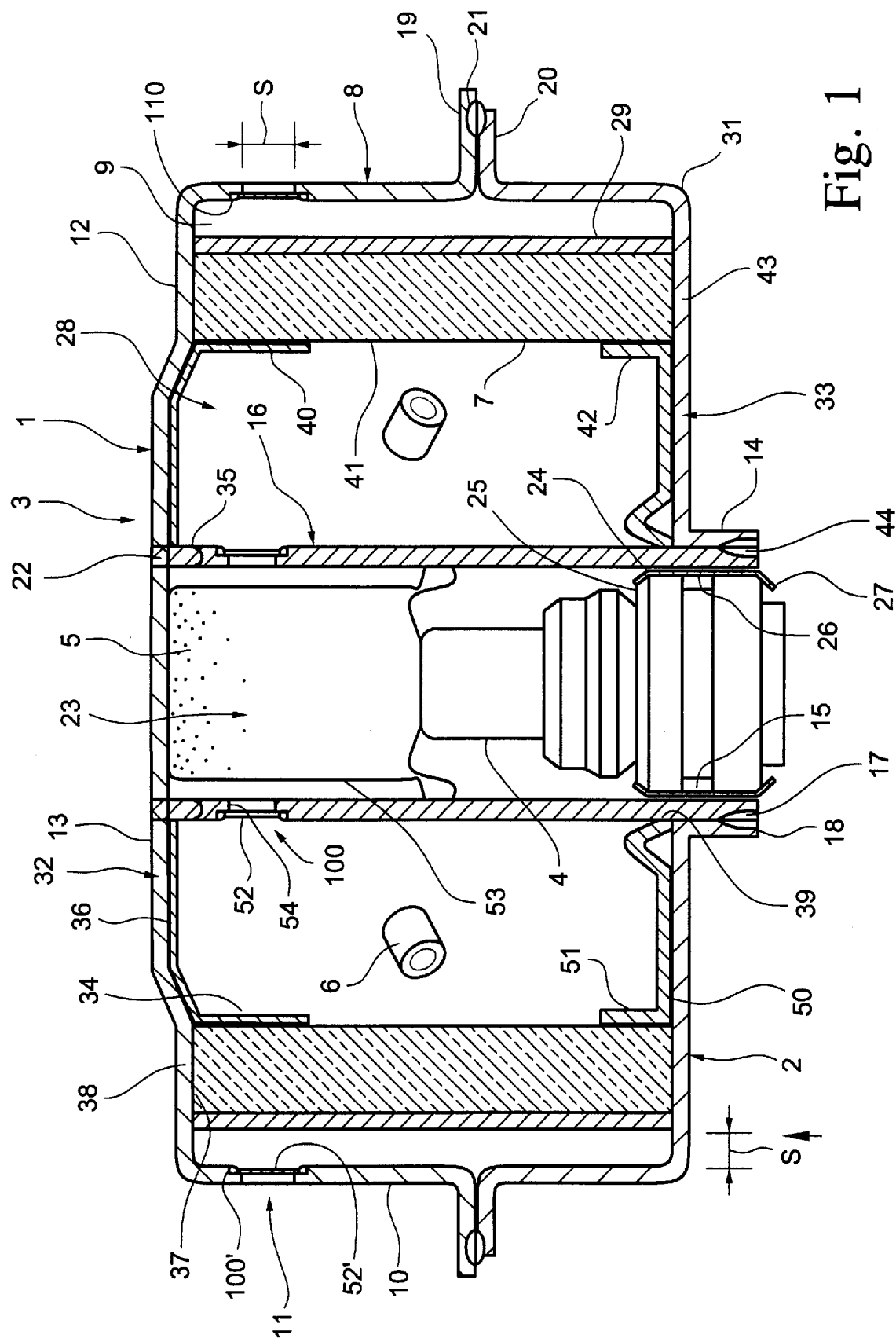
FIG. 1 is a cross sectional view of a gas generator according to one embodiment of the present invention.

In a preferred embodiment of the gas generator for an air bag of the present invention, a central cylindrical member is disposed within a housing, such that a circumferential wall of the central cylindrical member provides a partition wall between an igniting means storage chamber and a gas generating agent storage chamber. In this case, the central cylindrical member may be formed as a welded tube having an outside diameter of 17 to 20 mm, by rolling a stainless steel plate having a thickness of 1.2 to 2.0 mm into a tubular shape, and welding its joint. Such a welded tube may be formed by a UO press method (in which a sheet is formed into U-shape, and then into O-shape, followed by welding of its joint), or formed as an electric resistance welded tube (obtained by forming a sheet into a circular shape, and welding its joint under pressure with a large current flowing through it while generating resistance heat). A plurality of through-holes are formed through the circumferential wall of the central cylindrical member as the partition wall, for communicating the igniting means storage chamber. Where the central cylindrical agent storage chamber. Where the central cylindrical member provides the partition wall, the recess may be formed in the central cylindrical member by drilling a certain portion of the stainless steel plate or bending it into U-shape, and then forming the steel plate into O shape or effecting other operations as described above. In an alternative method, the central cylindrical member may be normally formed, and then a certain portion of the cylindrical member may be drilled or bent into U-shape to form the recess.

The igniting means storage chamber is defined by the central cylindrical member provided within the housing, and an igniting means is accommodated in this storage chamber. The igniting means comprises an igniter and a transfer charge. The inner circumferential portion of the central cylindrical member is internally threaded, while the outer circumferential portion of the igniter is externally threaded, and the igniter is fixed to the central cylindrical member by engaging the central cylindrical member with the igniter. The central cylindrical member and the igniter may be welded together to fix these members to each other.

Where the partition wall is provided by the central cylindrical member, and the cylindrical member is made separable from the housing, the volumes of the igniting means storage chamber and gas generating agent storage means may be advantageously changed as needed. The central cylindrical member may be fixed to the diffuser shell by a suitable method, such as friction welding, projection welding, laser welding, arc welding or electron beam welding.

A coolant support member is provided in the gas generating agent storage chamber. This coolant support member is disposed between the partition wall and a coolant which will be described later, and functions to inhibit movements of the coolant. The coolant support member normally includes bent portions formed by bending its radially outer and inner portions in the same direction, and is fixed between the partition wall and the coolant by resilient force of the bent portions. The coolant support member may further include a shield plate portion disposed to be opposed to the through-holes formed through the partition wall, so as to cover the inner circumferential surface of the coolant. In this case, the shield plate portion serves as a coolant protecting function of protecting the coolant against a flame ejected toward the coolant, and a combustion accelerating function of changing the direction of the ejected flame so that the flame is sufficiently circulated through the gas generating agent. The coolant support member may be formed from a stainless steel sheet or other steel sheet having a thickness of 0.5 to 1.0 mm.

In the gas generating agent storage chamber, a cushion member for the gas generating agent may be further provided as needed. This cushion member may be formed from a wire screen made of stainless steel, for example, and attached to the coolant support member. The cushion member also function as a coolant when it is formed from the wire screen made of stainless steel. The cushion member may also be formed from a silicone foam body.

The coolant is preferably formed by superposing some layers of plain-stitch wire screens in the radial direction, and compressing the wire screens in the radial direction and axial direction into a certain shape. The coolant thus formed has a complicated porous structure, and provides an excellent filtering effect. Thus, the coolant provide a coolant/filter unit having both cooling and filtering functions. More specifically, a plain-stitch wire screen made of stainless steel is formed into a cylindrical body, and one end portion of this cylindrical body is repeatedly bent outward to form an annular layered body, which is then compressed in a mold to form the coolant. In another method, a plain-stitch wire screen or mesh sheet made of stainless steel may be formed into a cylindrical body, and the cylindrical body is pressed in a radial direction and formed into a planar body, which is then rolled many times into a multi-layered body. This layered body is then compressed in a mold to thus form the coolant. The stainless steel used as a material for the wire screen may be selected from SUS304, SUS310S, SUS316 (according to Japanese Industrial Standard). In particular, SUS 304 (18Cr-8Ni-0.06C), which is austenitic stainless steel, shows excellent corrosion resistance. This coolant may have an outside diameter of 55 to 65 mm, inside diameter of 45 to 55 mm, and a height of 26 to 32 mm, for example.

The gas generating agent used in the present gas generator may be selected from those based on inorganic azide, in particular, sodium azide, that has been widely used; for instance, an equivalent mixture of soda azide and copper oxide may be used. In view of the safety and other aspects, however, a gas generating agent containing no azide may be advantageously used. To provide the non-azide gas generating agent, there has been proposed various compositions including: those containing tetrazole, triazole, or a nitrogen containing organic compound of these metal salts or the like, and an oxygen containing oxidizing agent, such as alkali metal nitrate, as major components; and those containing triaminoguanidine nitrate, carbohydrazide, nitroguanidine or the like as a fuel and a nitrogen source, and using nitrate, chlorate, or perchlorate of alkali metal or alkaline earth metal as an oxidizing agent. Although any of these compositions may be used as the gas generating agent according to the present invention, it is not limited to these compositions, but may be suitably selected depending upon combustion speed, non-toxicity, and combustion temperature requirements. The gas generating agent may be used in a suitable form, such as a pellet, wafer, hollow cylinder, or a disc.

Preferred embodiments of the present invention will be described, hereinafter, in accordance with the drawings.

Gas Generator for Air Bag

FIG. 1 is a vertical cross sectional view showing one embodiment of a gas generator for an air bag of the present invention. The present gas generator includes a housing 3 including of a diffuser shell 1 and a closure shell 2, a central cylindrical member 16 disposed within the housing 3 to provide a partition wall, igniting means comprising an igniter 4 and a transfer charge 5 disposed in a hollow portion inside the central cylindrical member 16, gas generating means in the form of solid masses of gas generating agent 6 which are to be ignited by the igniter 4 and transfer charge 5 to generate combustion gases, a filter in the form of a coolant/filter 7 disposed around the masses of gas generating agent 6, and coolant support members in the form of plate members 32, 33 disposed at the upper and lower end portions of the coolant/filter 7. In the present embodiment, a recess 100 is formed in the partition wall, or the central cylindrical member 16, for dividing the interior of the housing 3 into an igniting means storage chamber 23 for storing the igniting means, and a gas generating agent storage chamber 28 for storing the masses of generating agent 6, such that the recess 100 is located at a portion of the outer surface of the cylindrical member 16 to which a seal tape 52 is attached so as to close through-holes that communicate with these storage chambers. Another recess 100' is formed in a portion of the inner surface of the housing 3 to which a seal tape 52' is attached so as to close through-holes formed through the housing 3, through which generated gases are to be discharged.

The diffuser shell 1 is formed by pressing a stainless steel sheet, and its peripheral wall portion 10 is formed with eighteen 3 mm-diameter through-holes 11 through which the generated gases are discharged, such that the through-holes 11 are equally spaced apart from each other in the circumferential direction. The seal tape 52 comprising an aluminum tape closes the through-holes 11, so as to block entry of moisture or water vapors from the outer space into the housing 3. The annular recess 100' is formed in a portion of the peripheral wall portion 10 to which the seal tape 52' is attached, such that the depth and width of the recess 100' are substantially equal to the thickness and width of the seal tape 52'. After the seal tape 52' is attached inside the recess 100', sealant 110 is injected to cover upper and lower edge portions of the tape 52', so as to block entry of moisture from the exterior of the generator. This diffuser shell 1 has a circular portion 12 including a central portion in the form of a protruding circular portion 13 that protrudes outwards from a radially outer portion of the circular portion 12. This protruding circular portion 13 serves to increase the rigidity of the housing, in particular, of its ceiling portion, and also increase the volume of a storage space of the housing. A transfer charge container 53 for storing the transfer charge 5 is sandwiched by and between the protruding circular portion 13 and the igniter 4.

The closure shell 2 is formed by pressing a stainless steel plate, and has a central aperture 15 that is defined at its periphery by a bent portion 14 axially extending from the shell 2. The central cylindrical portion 16 is fitted in the central aperture 15, such that one of opposite end faces of the central cylindrical member 16 is flush with an end face 18 of the bent portion 14.

The diffuser shell 1 and closure shell 2 have respective flange portions 19, 20, which are superposed on each other and subjected to laser beam welding, so that these shells 1, 2 are joined together to form the housing 1. These flange portions 19, 20 serve to increase the rigidity of an outer circumferential wall 8 of the housing, thereby to prevent deformation of the housing due to the pressure of generated gases.

Figure 3:
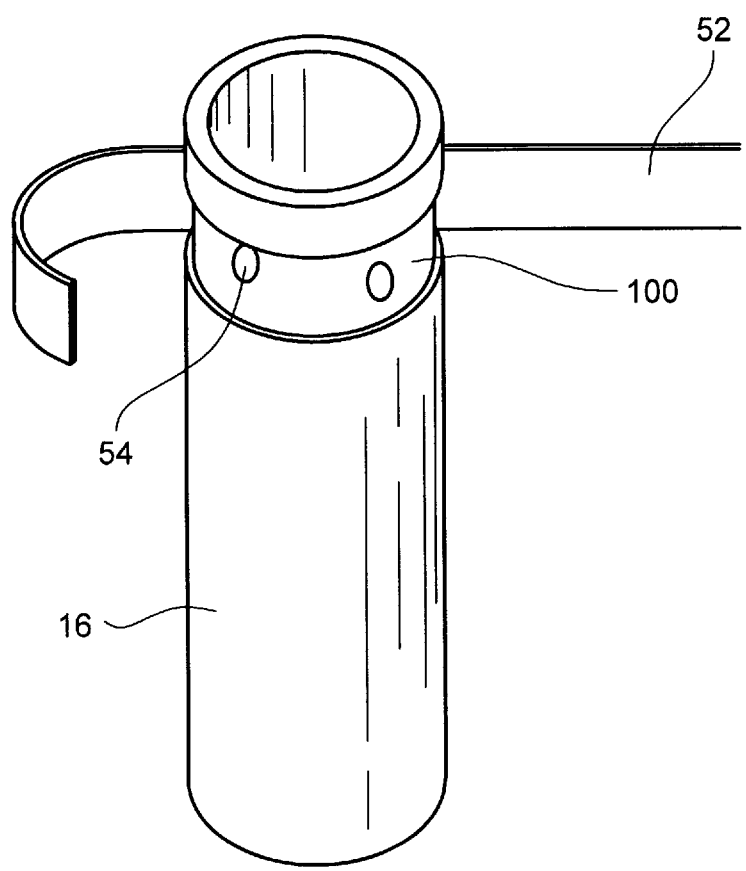
FIG. 3 is a perspective view of a central cylindrical member of FIG. 1.

The central cylindrical member 16 that provides the partition wall consists of a stainless steel tube which is open at both ends, as shown in FIG. 3, and its circumferential wall is formed with through-holes 54 through which a flame emitted by the transfer charge is expelled. In the present embodiment, six through-holes 54 having a diameter of 2.5 mm are equally spaced from each other while being arranged in a staggered form. The annular recess 100 is formed in a portion of the outer circumferential surface of this central cylindrical member which faces the gas generating agent storage chamber, to which portion the seal tape 52 for closing the through-holes 54 is attached. The seal tape 52 is attached to the inner wall of the recess 100 whose depth and width are larger than the thickness and width of the tape 52, such that the outer surface of the seal tape 52 does not protrude from the peripheral wall surface of the central cylindrical member 16, as shown in FIG. 3. Sealant 110 is applied to the upper and lower edge portions of the seal tape 52 so as to fill clearances between the tape 52 and the recess 100.

The central cylindrical member 16 is fixed at its end portion to the protruding circular portion 13 of the diffuser shell 1 by electron beam welding 22. The igniting means storage chamber 23 is formed inside this central cylindrical member 16, and the igniter 4 and the transfer charge container 53 are provided within the igniting means storage chamber 23. The igniter 4 is actuated in response to a signal from a sensor (81 in FIG. 5), and the transfer charge 5 filling the transfer charge container 53 is fired by the igniter 4. The central cylindrical member 16 has a holding member 24 for holding the igniter 4, and this holding member 24 consists of an inward flange portion 25 for limiting axial movements of the igniter 4, a cylindrical portion 26 in which the igniter 4 is fitted and which is fixed to the inner circumferential surface of the central cylindrical member 16, and a crimped portion 27 formed by crimping, which cooperates with the inward flange portion 25 to fix the igniter 4 in place in the axial direction.

The central cylindrical member 16 is a tube having an outside diameter of 17–20 mm, which is formed by rolling a stainless steel sheet having a thickness of 1.2–2.0 mm, and welding its joint. Such a welded tube may be formed by UO press method (in which a sheet is formed into a U-shape, and then into an O-shape, followed by welding of its joint), or formed as an electric resistance welded tube (obtained by forming a sheet into a circular shape, and welding its joint under pressure with a large current flowing through it while generating resistance heat).

Figure 4:
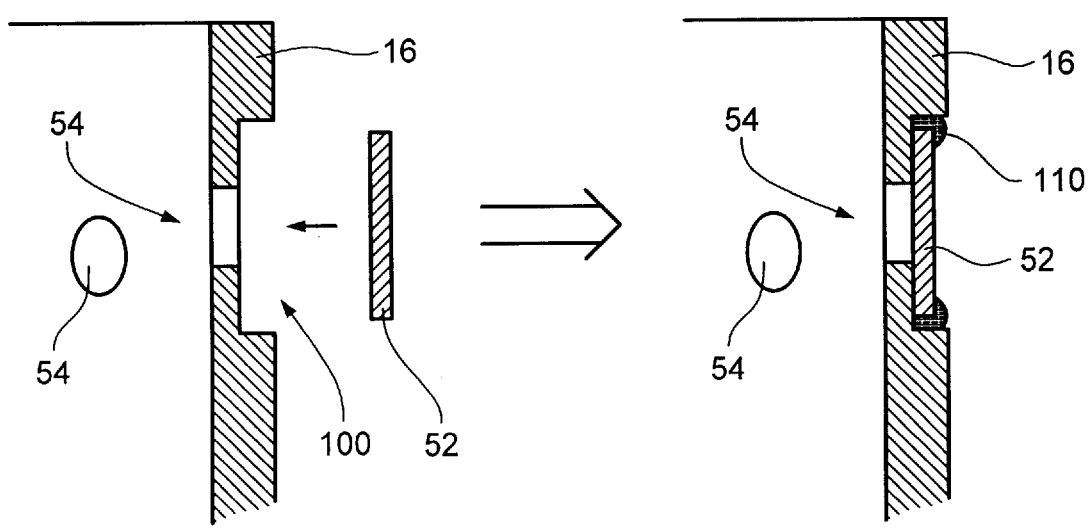
FIG. 4 is a cross sectional view showing in enlargement a principal portion of the central cylindrical member when the seal tape is attached to the member.

The bottom wall of each of the recesses 100' and formed in the diffuser shell 1 and central cylindrical member 16 is formed in parallel with the center axis of the housing that extends vertically through the diffuser shell 1 and closure shell 2, as shown in FIG. 4. In this arrangement, even if the wall surface of the housing 3 is slightly tapered by draft during press working, the strip-like seal tape 52' and can be attached to the bottom wall of the recess without causing vertical streaks, and its initial and terminal ends can be mated or aligned with each other. Thus, the problems caused by the tapered surface of the housing 3 formed by press working can be eliminated. The recess also functions to position the seal tape 52' and when attaching it to the diffuser shell or central cylindrical member, thus simplifying attachment of the seal tape 52' and during manufacture of the gas generator.

The coolant/filter 7 is disposed so as to surround the masses of the gas generating agent 6, and defines the annular gas generating agent storage chamber 28 which stores the gas generating agent masses around the central cylindrical member 16 and in which the gas generating agent is burned. The coolant/filter 7 is formed by superposing some layers of plain-stitch wire screens made of stainless steel in the radial direction, and compressing the wire screens in the radial direction and axial direction. In this coolant/filter 7, each layer has a loop-like mesh that is squashed or pressed out of shape, and such layers are laminated on each other in the radial direction. Thus, the coolant/filter 7 has a complicated porous structure, and provides an excellent scavenging effect. An outer layer 29 including of a layered wire net structure is formed outside the coolant/filter 7. This outer layer 29 serves as means for preventing the coolant/filter 7 from swelling or expanding out into a space 9 due to the gas pressure upon actuation of the gas generator, so that the space 9 is not closed by the coolant/filter 7. This outer layer 29 also has a cooling function. The coolant/filter 7 defines the gas generating agent storage chamber 28, and serves to cool the combustion gas generated in the storage chamber 28 while scavenging or removing combustion residues.

Between the outer circumferential wall 8 of the housing 3 and the coolant/filter 7, a radially inner surface 31 is formed which is inclined with respect to the center axis of the gas generator. This radially inner surface 31 is provided by corner portions of the housing 3 having a large R (radius of curvature), and forms a bowl-shaped surface around the coolant/filter 7. The coolant/filter 7 is positioned by this bowl-shaped surface which inhibits movements of the coolant/filter 7 in the radial direction. The radially inner surface 31 may be replaced by protruding portions formed at end portions of the coolant/filter 7 and abutting on the outer circumferential wall 8 of the housing 3. Such protruding portions may be used as means for positioning the coolant/filter 7 and inhibiting its radial movements.

A large number of solid masses of gas generating agent 6 are provided in the gas generating agent storage chamber 28. Each mass of the gas generating agent 6 has a hollow, cylindrical shape, which is advantageous in that combustion takes place at its outer surface and inner surface, and the surface area of the gas generating agent 6 as a whole does not significantly change as the combustion progresses.

The plate members 32, 33, as filter support members, are disposed at the upper end portion and lower end portion of the coolant/filter 7, respectively. The plate member 32 consists of a circular portion 36 closing an opening 40 at the upper end portion of the coolant/filter 7, and a circumferential wall portion 34 formed integrally with the circular portion 36 and abutting on an inner circumferential surface 41 of the coolant/filter 7. The circular portion 36 has a central aperture 35 fitting on the outer periphery of the central cylindrical member 16. The circumferential wall portion 34 opposes the through-holes 54 through which the flame of the igniting means is expelled, and covers the inner circumferential surface 41 of the coolant/filter 7 facing the through-holes 54. This circumferential wall portion 34 prevents the coolant/filter 7 from being damaged by the flame ejected toward the coolant/filter 7, and also functions to change the direction of the ejected flame so that the flame can be sufficiently circulated through the masses of gas generating agent 6. The plate member 32 is fixed to the central cylindrical member 16 which limits movements of the plate member 32 in radial directions, and serves as means for positioning the coolant/filter 7 during assembly of the gas generator. The plate member 32 also functions as short-pass preventing means for preventing the combustion gas from passing through between an inner surface 37 of the housing 3 and an end face 38 of the coolant/filter 7 when the gas generator is actuated.

The plate member 33 consists of a circular portion 50 for closing an opening 42 at the lower end portion of the coolant/filter 7, and a circumferential wall portion 51 formed integrally with the circular portion 50 and abutting on the inner circumferential surface 41 of the coolant/filter 7. The circular portion 50 has a central aperture 39 fitted on the outer periphery of the central cylindrical member 16, and is in contact with the masses of gas generating agent 6 to prevent movements of the gas generating agent masses. This plate member 33 is gripped by resilient force between the central cylindrical member 16 and the coolant/filter 7, and prevents the combustion gas from passing along the end face 43 of the coolant/filter 7 opposite to the above-indicated end face 38.

A space 9 is formed between the outer circumferential wall 8 of the housing and the outer layer 29 of the coolant/filter 7. This space 9 provides an annular gas passage as viewed in radial cross section, which is formed around the coolant/filter 7. While the radial cross sectional area of the gas passage is constant in the present embodiment, the coolant/filter 7 may be formed into a conical shape, such that the radial cross sectional area of the gas passage increases toward the gas discharge ports 11. In this case, the average value of varying areas may be regarded as the radial cross sectional area of the gas passage. The area St of the gas passage as measured in the radial cross section is made larger than the sum Sa of opening areas S of the through-holes 11 of the diffuser shell 1. In the presence of the gas passage around the coolant/filter 7, the combustion gas passes through the whole region of the coolant/filter 7, to be directed toward the gas passage, thereby achieving efficient use of the coolant/filter 7 and effective cooling and purification of the combustion gas. The combustion gas thus cooled and purified by the coolant/filter 7 reaches the through-holes 11 of the diffuser shell 1, through the gas passage as described above.

In assembling the gas generator of the present embodiment, the central cylindrical member 16, having the recess 100 to which the seal tape 52 for closing the through-holes 54 is attached, is joined to the diffuser shell 1 having the recess 100' to which the seal tape 52' for closing the through-holes 11 is attached. With the diffuser shell 1 being placed on its bottom provided by the protruding circular portion 13, the plate member 32 is passed along the central cylindrical member 16, and the coolant/filter 7 is fitted on the outside of the circumferential wall portion of the plate member 32, so that the coolant/filter 7 is positioned by the plate member 32. The space inside of the coolant/filter 7 is filled with the solid masses of gas generating agent 6, and then covered with the plate member 33. Thereafter, the closure shell 2 is mounted on the plate member 33 by inserting the central cylindrical member 16 through the central aperture 15 of the closure shell 2, and the flange portion 20 of the closure shell 2 is superposed on the flange portion 19 of the diffuser shell 1. In this state, the diffuser shell 1 is secured to the closure shell 2 by laser welding 21, and the closure shell 2 is secured to the central cylindrical member 16 by laser welding 44. In the final step, the igniting means container 53 and the igniter 4 are inserted in the central cylindrical member 16, and the end portion 27 of the igniter holding member is crimped so as to fix the container 53 and igniter 4 in position. The plate member 33 also functions as a welding protective plate during welding operations.

Since the seal tape attached to the central cylindrical member 16 is completely received in the recess 100, there is no possibility that the seal tape is damaged when the plate members 32, 33 are passed along the cylindrical member 16.

In the present gas generator constructed as described above, when an impact is detected by a sensor (81 in FIG. 5), a signal is transmitted from the sensor to the igniter 4, which is then actuated to fire the transfer charge 5 in the igniting means container 53, thereby to produce a high-temperature flame. This flame is ejected through the through-holes 54, to ignite or fire the masses of gas generating agent 6 around the through-holes 54, and then directed downward to ignite the masses of gas generating agent 6 located in the lower portion of the gas generating agent storage chamber. As a result, the gas generating agent masses 6 are burned so as to produce high-temperature, high-pressure gases, and the combustion gases thus produced pass through the whole region of the coolant/filter 7, such that the gases are effectively cooled and the combustion residues are scavenged or removed during the passage. The combustion gases thus cooled and purified pass through the gas passage (space 9), and rupture the aluminum tape 52, to be ejected from the gas discharge ports 11 and flow into an air bag (84 in FIG. 5). The air bag then expands or inflates to form a cushion between a passenger and a hard structure, thereby to protect the passenger against the impact. When the housing is deformed in the vertical direction upon receiving the pressure of the combustion gases, the upper and lower plate members are also moved in the vertical direction due to the gas pressure. In this case, even if a clearance appears between an end face of the coolant/filter and an inner surface of the housing, the combustion gases are prevented from short-passing through the clearance due to the presence of the plate members.

Figure 2:
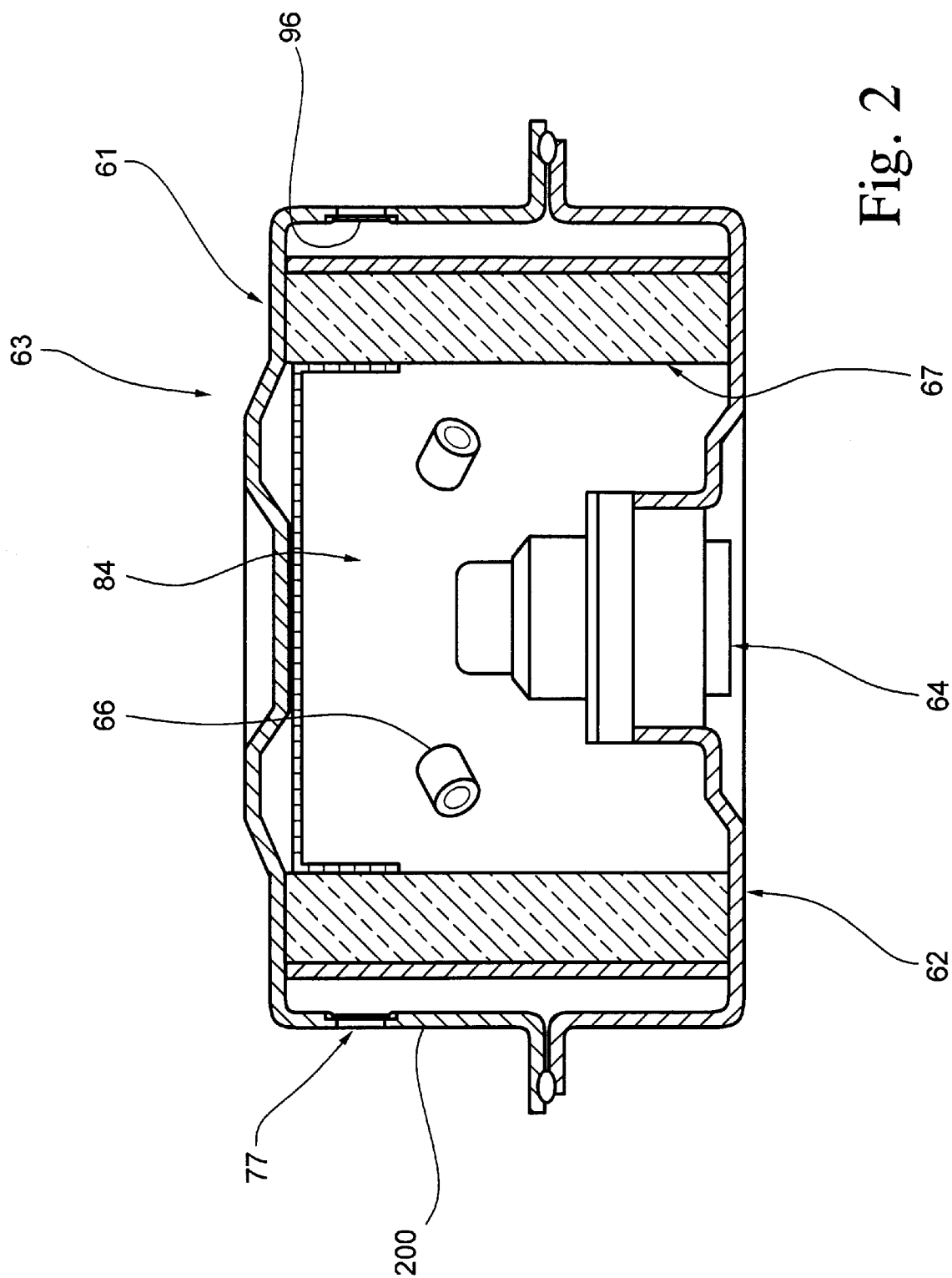
FIG. 2 is a cross sectional view of a gas generator according to another embodiment of the present invention.

FIG. 2 shows a gas generator for an air bag system according to another embodiment of the present invention. In this gas generator, a recess 200 is formed in a portion of a diffuser shell 1 (61) to which a seal tape for closing through-holes of the diffuser shell is attached. In particular, this embodiment is useful as a gas generator whose housing has an outside diameter of around 60 mm. The present gas generator includes a housing 63 including of the diffuser shell 61 and a closure shell 62, an igniter 64 disposed in a storage space within the housing 63, solid masses of gas generating agent 66 that are to be ignited by the igniter 64 to produce combustion gases, and a coolant/filter 67 that defines a gas generating agent storage chamber 84 for storing these gas generating agent masses 66. In FIG. 2, reference numeral 77 denotes a through-hole, 91 denotes a filter support member, and 96 denotes a seal tape.

Air Bag System

Figure 5:
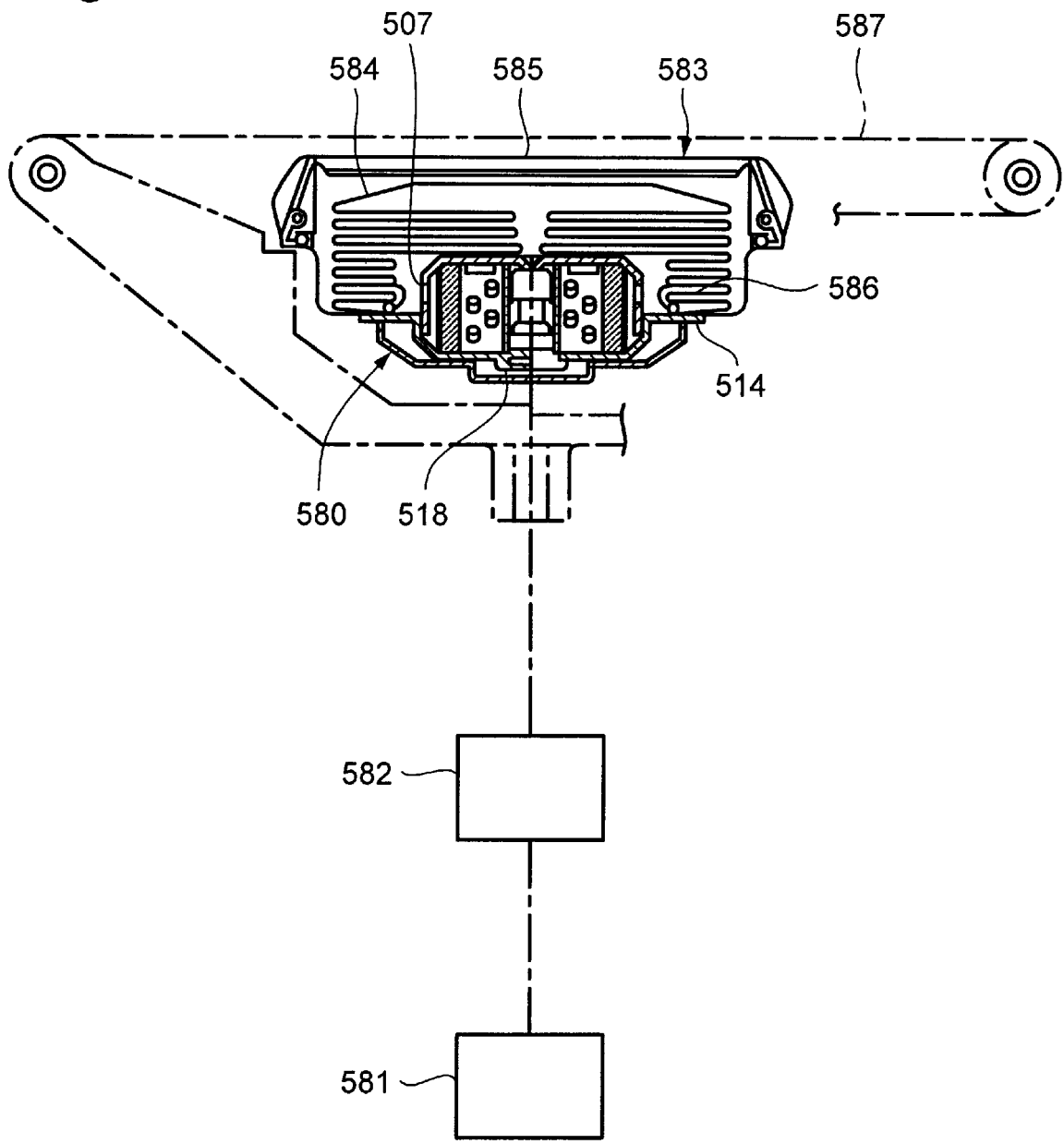
FIG. 5 is a view showing the construction of an air bag system of the present invention.

FIG. 5 shows an example of an air bag system having the gas generator of the present invention. This air bag system includes a gas generator 580, an impact sensor 581, a control unit 582, a module case 583, and an air bag 584.

The gas generator explained above with reference to FIG. 1 is used as the gas generator 580.

The impact sensor 581 may consist of a semiconductor type acceleration sensor, for example. In this semiconductor type acceleration sensor, four semiconductor strain gauges are formed on a beam of a silicon substrate that is adapted to deflect upon application of acceleration, such that these strain gauges are connected in a bridge form. The beam is deflected upon application of acceleration thereto, and strains appear on the surface of the beam. The resistance of the semiconductor strain gauges changes due to the strains, and the changes in the resistance are detected as voltage signals that are proportional to the applied acceleration.

The control unit 582 includes an ignition determining circuit, which receives signals from the semiconductor type acceleration sensor. At the point of time when the impact signal from the impact sensor exceeds a given value, the control unit 582 starts computing, and generates an actuation signal to the igniter 518 of the gas generator 580 when the result of computing exceeds a give value.

The module case 583 is formed of polyurethane, for example, and includes a module cover 585. The air bag 584 and gas generator 580 are accommodated in the module case 583, to provide a pad module which is attached to a steering wheel 587 of an automobile.

The air bag 584 is formed of nylon (nylon 66, for example), or polyester, and fixed to the flange portion 514 of the gas generator as it is folded, with its opening 586 surrounding the gas discharge ports 507 of the gas generator.

When the semiconductor type accelerator sensor 581 detects an impact upon crashing of the automobile, an output signal of the sensor 581 is transmitted to the control unit 582, and the control unit 582 starts computing at the point of time when the impact signal from the sensor exceeds a given value. The control unit 582 then generates an actuation signal to the igniter 581 of the gas generator 580 when the result of computing exceeds a given value. As a result, the igniter 518 is actuated to ignite the masses of the gas generating agent, thereby to cause the agent to burn and produce gases. The gases thus generated are blown into the air bag 584, so as to inflate the air bag 584 while breaking the module cover 585, so that the inflated air bag 584 forms a cushion between the steering wheel 587 and the passenger so as to absorb the impact.

In the gas generator of the present invention, the seal tape for closing the through-holes of the partition wall is attached to the bottom wall of the annular recess formed in a portion of the partition wall to which the seal tape is to be attached. Therefore, the seal tape is not damaged during assembly of the gas generator, and can be easily attached to the portion of the partition wall where the recess is formed. Further, since the bottom wall of the recess is formed in parallel with the center axis of the housing, the seal tape can be securely attached to the bottom wall of the recess even if the surface of the housing or other member to which the seal tape is attached is slightly tapered by draft during press working, or involves protrusions and recesses, or deformation. In addition, the initial and terminal ends of the seal tape attached in a cylindrical shape can be mated or aligned with each other on the bottom surface of the recess, and therefore the width of the seal tape used can be minimized. Moreover, the seal tape can block entry of moisture with higher reliability where the opposite edges of the seal tape received in the recess are sealed with the sealant. Thus, the gas generator of the present invention has an extremely good sealing effect, assuring a significantly improved combustion efficiency.

The use of the gas generator for the air bag as described above makes it possible to provide an air bag system that can be easily manufactured and operates with increased safety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A gas generator for an air bag, comprising:
    a housing that stores a gas generating agent, said housing having upper and lower plate members and a wall member connecting said upper and lower plate members;
    an igniter adapted to ignite said gas generating agent;
    a coolant/filter adapted to cool and filter combustion gas generated by said gas generating agent;
    a recess formed in said wall member along an entire peripheral portion thereof, said recess having a bottom wall provided with a plurality of through-holes; and
    a seal tape attached to the bottom wall of said recess for closing said through-holes.

2. A gas generator for an air bag according to claim 1, wherein said wall member is a partition wall that divides said housing into an igniter storage chamber that stores said igniter and a gas generating agent storage chamber that stores said gas generating agent, said recess being formed in a portion of the partition wall to which said seal tape is attached to close said through-holes formed in the partition wall for communicating said storage chambers.

3. A gas generator for an air bag according to claim 2, wherein said through-holes formed in the partition wall are closed by said seal tape attached to an outer wall surface of the partition wall, said recess being formed in a portion of the outer wall surface of the partition wall to which said seal tape is to be attached.

4. A gas generator for an air bag according to claim 2, wherein said partition wall is a cylindrical wall portion of a central cylindrical member disposed in said housing, said igniter storage chamber and said gas generating agent storage chamber being separated from each other by said cylindrical wall portion of said central cylindrical member.

5. A gas generator for an air bag according to claim 1, wherein said recess is formed in a peripheral wall portion of said housing to which said seal tape is attached to close said through-holes formed in said peripheral wall portion that allows the combustion gas to discharge therethrough.

6. A gas generator for an air bag according to claim 5, wherein said through-holes formed in said peripheral wall portion of said housing are closed by said seal tape attached to an inner surface of said peripheral wall portion, and said recess is formed in a portion of the inner surface of said peripheral portion of said housing to which said seal tape is attached.

7. A gas generator for an air bag according to claim 1, wherein said seal tape has a width that is 2 to 3.5 times a diameter of said through-holes.

8. A gas generator for an air bag according to claim 1, wherein said seal tape includes an aluminum tape having a thickness of 25 to 80$\mu$, and an adhesive having a thickness of 25 to 60$\mu$, said aluminum tape having a total thickness of 95±45$\mu$.

9. A gas generator for an air bag according to claim 1, wherein side edges of the seal tape attached to the bottom wall of the recess are sealed by a sealant.

10. A gas generator for an air bag according to claim 1, wherein an outer surface of said seal tape is substantially flush with a curved surface of said wall member.

11. A gas generator for an air bag according to claim 1, wherein the bottom wall of said recess is formed in parallel with a center axis of said housing.

12. A gas generator for an air bag according to claim 1, wherein said housing includes a diffuser shell having a gas discharge port, and a closure shell having a central aperture, said diffuser shell and said closure shell being formed by press working.

13. A gas generator for an air bag according to claim 2, wherein said coolant/filter for cooling a combustion gas and scavenging combustion residues is disposed to surround the partition wall, and that a coolant support member is provided between said coolant/filter and said partition wall for inhibiting movement of said coolant/filter.

14. A gas generator for an air bag according to claim 1, wherein a supporter for supporting the gas generating agent is provided between said coolant/filter and said partition wall.

15. An air bag system, comprising:

an airbag;

a gas generator adapted to generate gas to inflate said airbag; and a module case in which said air bag is accommodated,
wherein said gas generator includes,
a housing that stores a gas generating agent, said housing having upper and lower plate members and a wall member connecting said upper and lower plate members,
an igniter adapted to ignite said gas generating agent,
a coolant/filter adapted to cool and filter combustion gas generated by said gas generating agent,
a recess formed in said wall member along an entire peripheral portion thereof, said recess having a bottom wall provided with a plurality of through-holes, and
a seal tape attached to a bottom wall of said recess for closing said through-holes.

16. A gas generator for an air bag according to claim 1, wherein a depth of said recess is equal to or greater than a thickness of said attached seal tape.

17. A gas generator for an air bag according to claim 1, wherein a width of said recess is equal to or greater than not smaller than a width of said attached seal tape.

* * * * *

UNITED STATES PATENT AND TRADEMARK OFFICE
CERTIFICATE OF CORRECTION

PATENT NO. : 5,951,041
DATED : Sept. 14, 1999
INVENTOR(S) : IWAI et al.

It is certified that error appears in the above-identified patent and that said Letters Patent is hereby corrected as shown below:

On the title page, item

"[30] Foreign Application Priority Data", please correct the date from "Dec. 31, 1996" to -- Oct. 31, 1996 --.